US006938509B2

(12) United States Patent
Bulgrien

(10) Patent No.: US 6,938,509 B2
(45) Date of Patent: Sep. 6, 2005

(54) TRANSMISSION SHIFT CONTROL FOR SELECTING FORWARD, REVERSE, NEUTRAL AND PARK, AND METHOD OF OPERATION OF THE SAME

(75) Inventor: Garth H. Bulgrien, Ephrata, PA (US)

(73) Assignee: CNH America LLC, New Holland, PA (US)

(*) Notice: Subject to any disclaimer, the term of this patent is extended or adjusted under 35 U.S.C. 154(b) by 1 day.

(21) Appl. No.: 10/601,408

(22) Filed: Jun. 23, 2003

(65) Prior Publication Data

US 2004/0255706 A1 Dec. 23, 2004

(51) Int. Cl.[7] ................................................ B60K 41/26

(52) U.S. Cl. ...................................... 74/335; 192/219.6

(58) Field of Search .............................. 74/335, 336 R, 74/473.19; 477/92, 96; 192/219.6, 219, 219.4, 222

(56) References Cited

U.S. PATENT DOCUMENTS

| | | | | |
|---|---|---|---|---|
| 2,247,368 A | * | 7/1941 | Woodbury | 192/219.6 |
| 2,725,131 A | * | 11/1955 | Martin | 192/219.6 |
| 3,136,399 A | * | 6/1964 | Granryd | 192/219.6 |
| 3,480,120 A | * | 11/1969 | Lenzen et al. | 192/219.6 |
| 3,788,422 A | | 1/1974 | Fowler | |
| 3,858,695 A | * | 1/1975 | Whisler | 192/219.6 |
| 4,398,618 A | * | 8/1983 | Hansen | 74/471 R |
| 4,660,696 A | * | 4/1987 | Kusaka | 192/222 |
| 4,922,769 A | | 5/1990 | Tury | |
| 5,247,849 A | | 9/1993 | Sato | |
| 5,265,018 A | | 11/1993 | Sokol et al. | |
| 5,388,476 A | | 2/1995 | Harger et al. | |
| 5,406,860 A | | 4/1995 | Easton et al. | |
| 5,429,559 A | | 7/1995 | Steeby | |
| 5,450,768 A | | 9/1995 | Bulgrien et al. | |
| 5,519,256 A | | 5/1996 | Goodridge | |
| 5,617,760 A | | 4/1997 | Woeste et al. | |
| 5,630,489 A | | 5/1997 | Bebernes | |
| 5,803,217 A | | 9/1998 | Park | |
| 5,880,422 A | | 3/1999 | Sato et al. | |
| 5,910,067 A | * | 6/1999 | Vandendriessche et al. | 477/92 |
| 5,957,001 A | | 9/1999 | Gualtieri et al. | |
| 6,047,609 A | | 4/2000 | Brower et al. | |
| 6,065,560 A | | 5/2000 | Palmeri et al. | |
| 6,151,543 A | | 11/2000 | McKee et al. | |
| 6,295,887 B1 | | 10/2001 | DeJonge et al. | |
| 6,425,450 B1 | | 7/2002 | Lansberry | |
| 6,450,587 B1 | | 9/2002 | MacGregor et al. | |
| 2002/0162699 A1 | | 11/2002 | Shiomi et al. | |
| 2003/0042063 A1 | | 3/2003 | Arthur et al. | |

FOREIGN PATENT DOCUMENTS

| | | |
|---|---|---|
| EP | 1239192 A2 | 9/2002 |

* cited by examiner

*Primary Examiner*—Sherry Estremsky
(74) *Attorney, Agent, or Firm*—John William Stader

(57) ABSTRACT

A three transmission position shift control includes a forward position, a neutral position and a reverse position, and a switch or button operable for engaging a park brake or park lock when in the neutral position. The control can include a shift lever shiftable or between the forward, neutral and reverse positions. The park switch or button which can be a momentary switch on the lever or a hand grip of the lever is operable for controlling a solenoid that activates the park brake or park lock. Park is deactivated or released by shifting into forward or reverse.

13 Claims, 4 Drawing Sheets

TRANSMISSION SHIFT CONTROL FOR SELECTING FORWARD, REVERSE, NEUTRAL AND PARK, AND METHOD OF OPERATION OF THE SAME

TECHNICAL FIELD

This invention relates generally to a transmission shift control for vehicles, particularly work machines such as tractors and the like, and more particularly, to a transmission shift control movable or shiftable between forward, rearward and neutral positions or modes, and which includes a switch or button operable for actuating or engaging a park brake or park lock when the control is in the neutral position or mode, the control being automatically operable for deactuating or releasing the park brake or lock when moved or shifted from the neutral position or mode to the forward or reverse positions or modes.

BACKGROUND ART

Controls for the park brake or park lock on tractors having power-shuttle transmissions are typically one of two known types. The first type has a park position on a shift lever that also controls forward, neutral, and reverse operation of the transmission. The second type uses a separate mechanical park brake lever, which allows use of a three position shuttle lever. A possible shortcoming of the first type is a greater space requirement for accommodating shifting between four positions, which can result in occasional inadvertent shifting into park. A possible shortcoming of the second type is that because the shuttle lever and brake lever are separate, the shuttle lever can be operated while the park brake is inadvertently engaged.

Thus, what is sought is a transmission shift control operable for selecting forward, reverse, neutral and park modes, without requiring a separate park position so as to provide relative compactness, yet which reduces or eliminates the possibility of inadvertent shifting into park, and operating the transmission in the forward and reverse modes while the park brake or lock is inadvertently actuated or applied.

SUMMARY OF THE INVENTION

According to the present invention, a three position or mode shift control including a forward position or mode, a neutral position or mode, and a reverse position or mode, and a switch or button operable for engaging a park brake or park lock, is disclosed. The control preferably includes a shift lever shiftable or between the forward, neutral and reverse positions or modes, and a park switch or button is preferably a momentary switch on the lever or a hand grip of the lever operable for controlling a solenoid that actuates the park brake or park lock. Also preferably, the park switch or button is clearly visible. Park is actuated by operating the switch or button while the shift control is in the neutral position or mode. Park is deactuated or released by shifting into the forward or reverse position or mode.

An advantage of the present invention is a compact shuttle shift pattern with only three positions and no additional movement of the shift control to select park. As another advantage, shuttle shifting can be performed with less possibility of accidentally moving the control to the park position. As still another advantage, no separate lever is required to engage or actuate the park brake or lock. Additionally, park is automatically deactuated or released when the shift control is shifted into the forward or reverse positions.

DETAILED DESCRIPTION OF THE INVENTION

Figure 1:
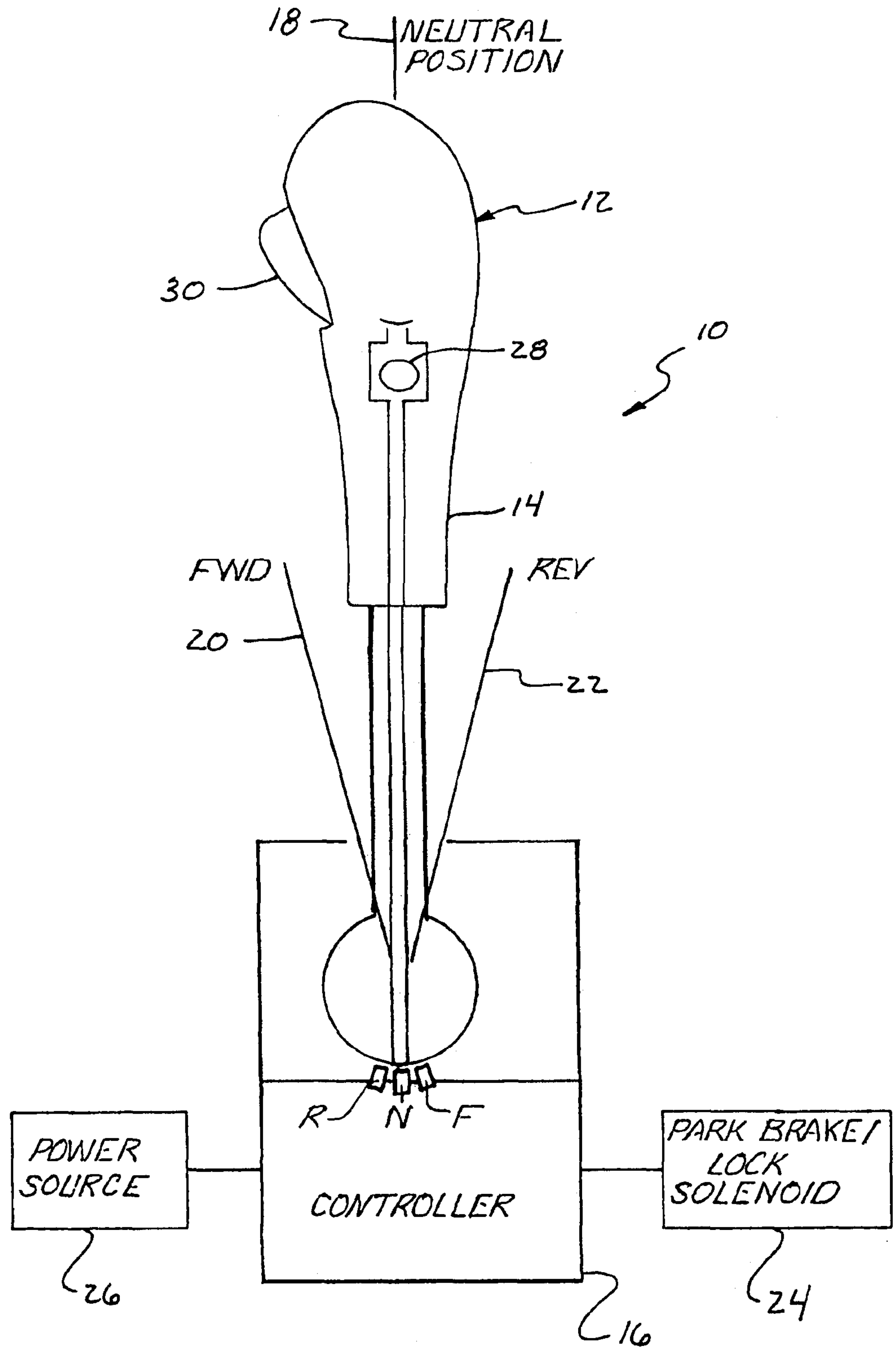
FIG. 1 is a simplified schematic representation of a transmission shift control including a switch for actuating or engaging a park brake or park lock when in a neutral position according to the invention.

Referring now to the drawings, in FIG. 1 a transmission shift control 10 constructed and operable according to the present invention for selecting forward, reverse, neutral and park, is shown. Control 10 includes a shift lever assembly 12 locatable adjacent to the operator position such as in the operator cab adjacent to the operator seat, or at another convenient location on a vehicle, which can be a work machine such as a tractor (not shown). Shift lever assembly 12 will be suitably connected to a transmission control (not shown) of the vehicle in a well known manner, and includes a shifter lever 14 selectably movable relative to a controller 16 between a neutral position shown aligned along a line 18, and forward and reverse positions aligned along lines 20 and 22, respectively, for shifting the transmission of the vehicle between neutral, forward, and reverse operating modes in the well known manner. When lever 14 is in the neutral position it is desirable to have the capability to actuate or engage a park or parking brake or lock, without having to move an additional, separate element such as a lever or pedal, and to automatically deactuate or disengage or release the brake or lock when lever 14 is moved from the neutral position to either of the forward or reverse positions. The park brake or lock will be controlled by a park brake/lock solenoid 24 which will receive power from a power source 26 of the vehicle, through controller 16. Preferably, the park brake or lock will be actuated or engaged when solenoid 24 does not receive power from power source 26, and disengaged when solenoid 24 is energized by the power source. The park brake or lock is manually actuable or engageable by depressing or otherwise changing the state of a park switch 28 located at a predetermined position on lever 14. Lever 14 is movable from the neutral position by depressing a neutral latch 30, also on lever 14. Controller 16 is connected to power source 26, solenoid 24, and the transmission control by suitable conductive paths, such as wires of a wiring harness of the vehicle or the like, in the well known manner.

Figure 2:
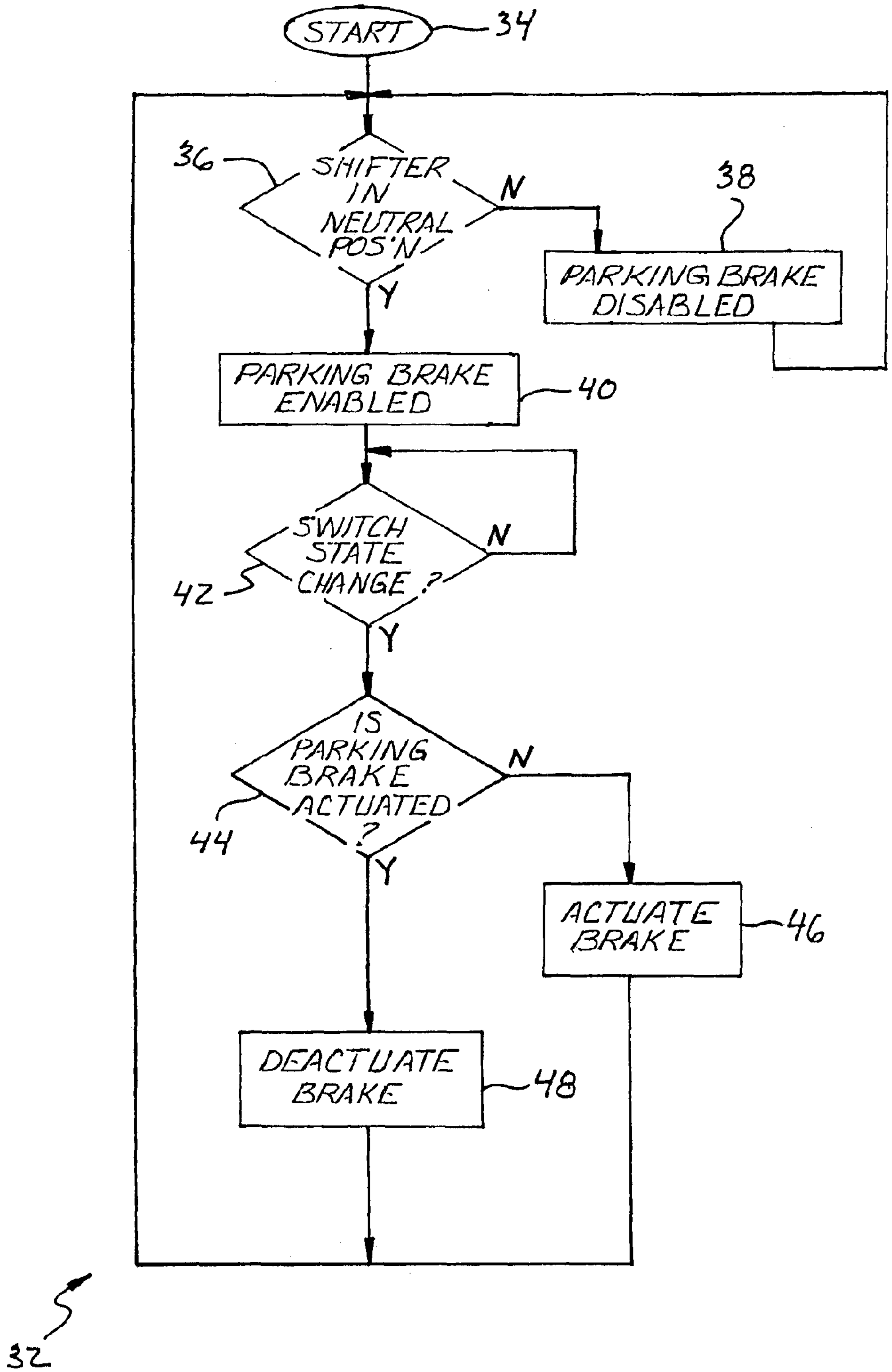
FIG. 2 is a simplified, high level flow diagram showing steps of one method of operation of the shift control according to the invention.

Referring also to FIG. 2, which shows a diagram 32 including steps of a preferred method of operation of control 10, beginning at start block 34, it is determined if shifter lever 14 is in the neutral position, as denoted at decision block 36. If not, the manual control of the parking brake or lock through switch 28 is disabled, that is, switch 28 cannot be used to actuate the brake or lock, as denoted at block 38. If shifter 14 is in the neutral position, the parking brake or lock is enabled, as denoted at block 40. That is, switch 28 can be used. It is now determined if there is a change of state of switch 28, as denoted at decision block 42. If not, the state of brake remains the same. If the state of switch 28 changes, it is determined if the brake is actuated, as denoted at block 44. If the brake is not presently actuated, it is actuated, as denoted at block 46. If at block 44 the brake is presently actuated, the brake is deactuated or released, as denoted at block 48. This illustrates the capability to actuate and deactuate or release the brake with shifter 14 in the neutral position using switch 28. The brake is also automatically deactuated or released when shifter 14 is moved from the neutral position to either of the forward or reverse positions.

Figure 3:
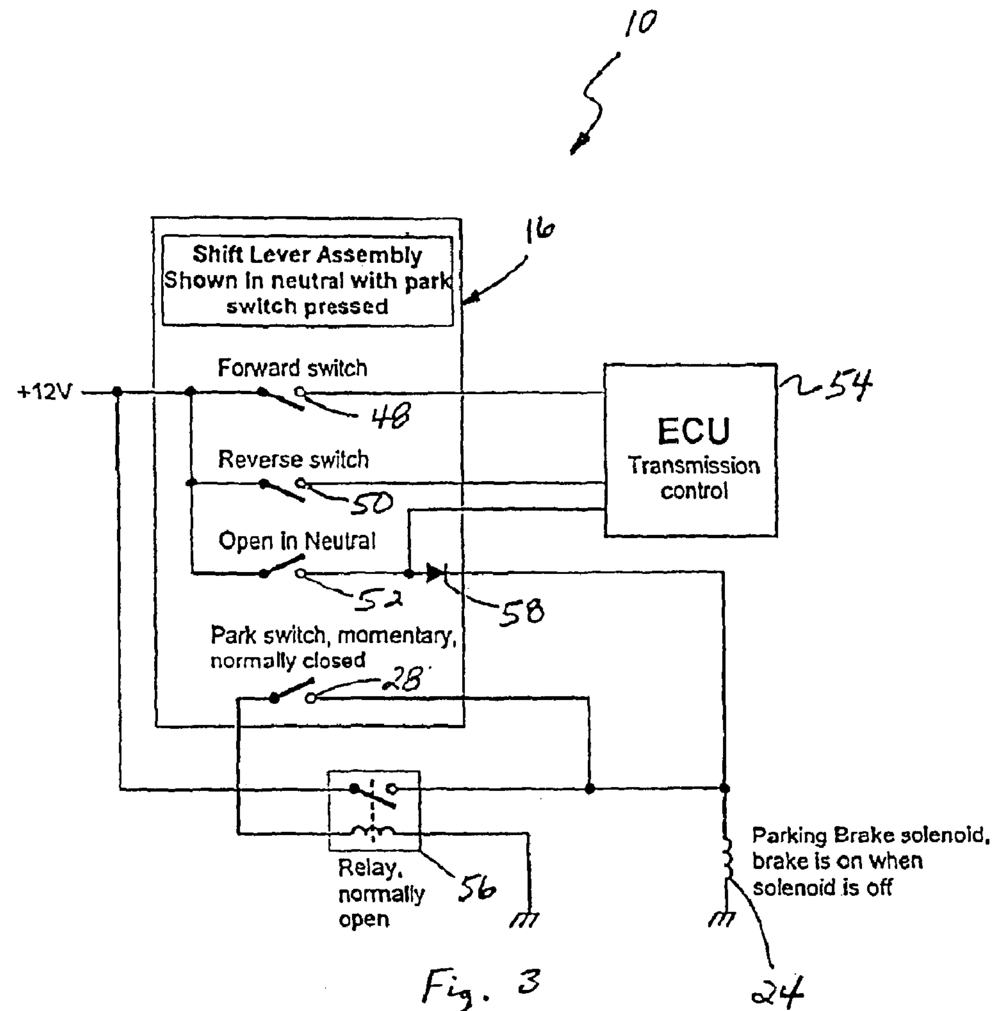
FIG. 3 is a simplified block diagram showing elements of circuitry of one shift control according to the invention.

Referring also to FIG. 3, a preferred embodiment of controller 16 for shift control.10 is illustrated. Controller 16 includes a forward switch 48, a reverse switch 50, and a neutral switch 52, all being single pole, single throw switches having first contacts connected commonly to a power source and second contacts individually connected to an electronic control unit (ECU) transmission control 54 that can be of conventional construction and operation. Park switch 28 is shown as a normally closed momentary contact switch having a contact connected to the second contact of neutral switch 52 through a diode 58 and an opposite contact connected to one side of a coil of a relay 56. Relay 56 has a first contact connected to the power source and a second contact connected to the second contact of neutral switch 52 through diode 58. Solenoid 24 is connected commonly with park switch 28 and relay 56 through diode 58 to the second contact of neutral switch 52. As noted, controller 16 is shown in neutral with normally closed park switch 28 pressed which opens the switch to effect a change of its state.

In operation, at start up in neutral, neutral switch 52 is open and park switch 28 is in its normally closed state, such that no power is present at solenoid 24 and, as a result, the park brake or lock is actuated. Then, when the shifter is shifted into either forward or reverse, neutral switch 52 closes, supplying power to solenoid 24 to automatically deactuate or release the brake. At the same time, because park switch 28 is normally closed, power through neutral switch 52 will flow through park switch 28 to the coil of relay 56 to close or latch it so as to connect solenoid 24 to power therethrough. Then, the shifter can be shifted through forward, reverse and neutral with the park brake or lock deactuated or released. To actuate park, when in neutral, park switch 28 can be pressed to change its state to open. This de-energizes relay 56 causing it to open. Because neutral switch 52 is open, power is removed from solenoid 24 and the brake is actuated. Then, when the shifter is moved to one of the other positions, power is supplied through neutral switch 52 to the solenoid and through the park switch to the relay to latch it and deactuate or release the brake.

Figure 4:
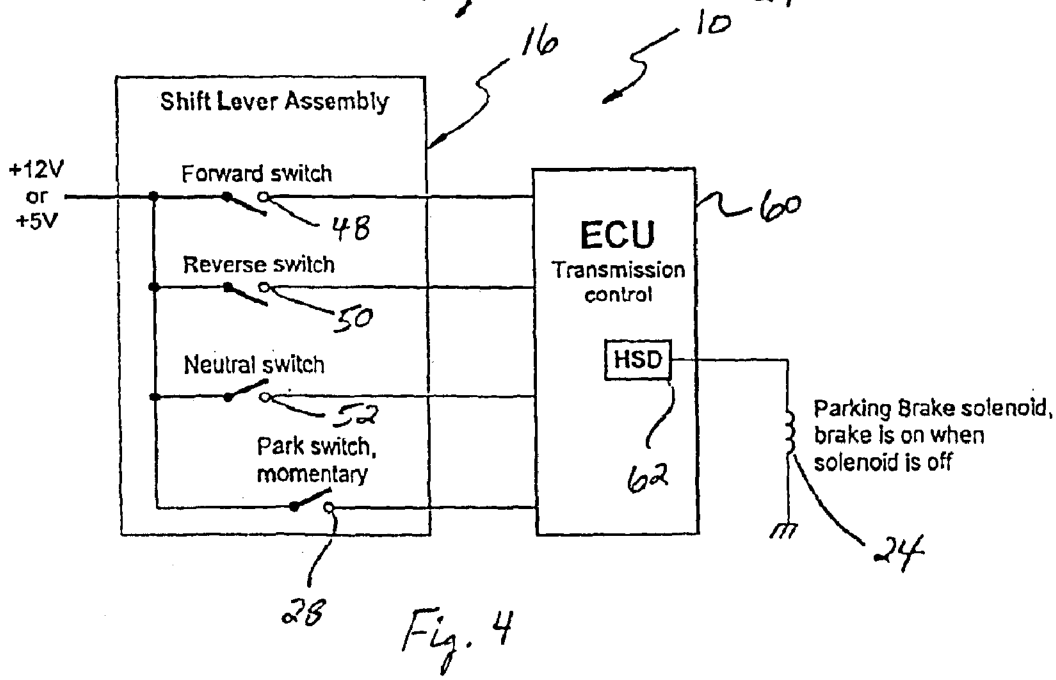
FIG. 4 is a simplified block diagram of circuitry of another shift control according to the invention.

Turning also to FIG. 4, a simpler version of controller 16 is shown for use with an ECU transmission control 60 having an electronic actuator and circuitry for controlling solenoid 24 via a high side driver (HSD). Controller 16 includes forward switch 48, reverse switch 50, and neutral switch 52 connected essentially as before to an ECU transmission control 60. Park switch 28 connects directly to the power source and to the ECU 60, and is operable for actuating solenoid 24 in a desired manner, such as described in reference to FIG. 2 above.

Figure 5:
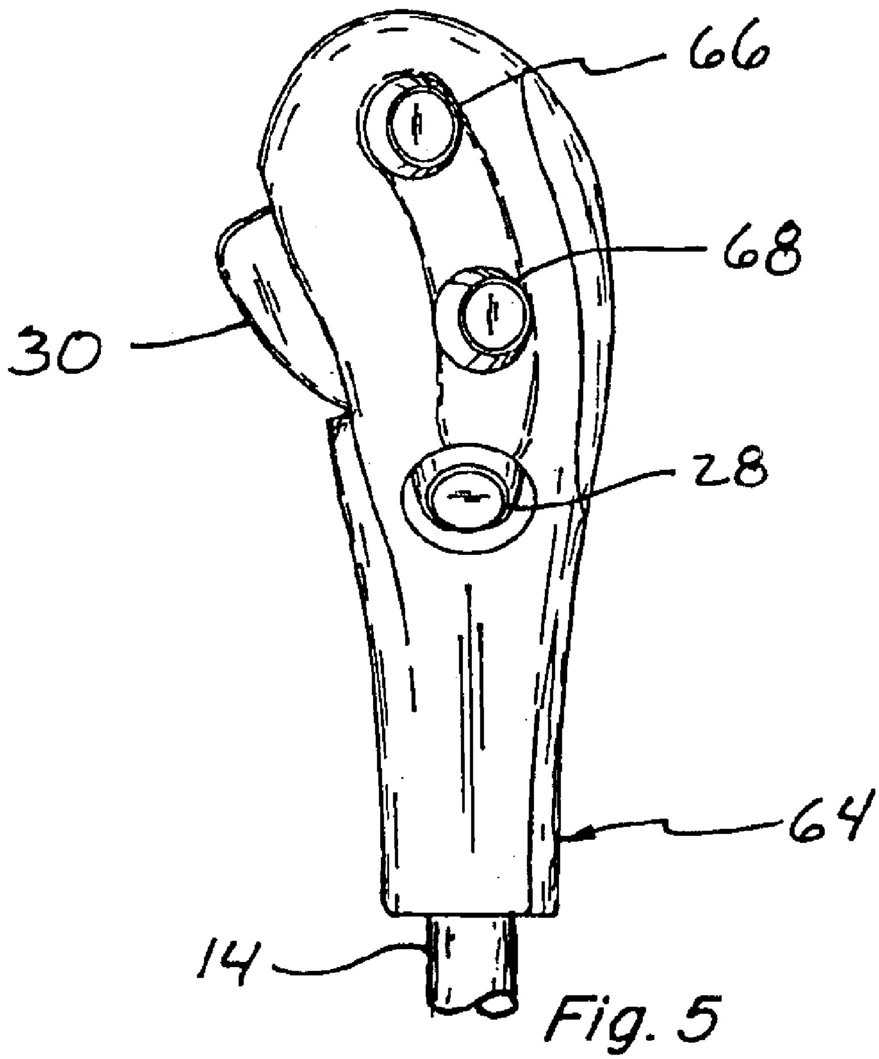
FIG. 5 is a perspective view of a shifter grip for the shift control of the invention.

In FIG. 5, a shifter grip 64 for lever 14 is shown, including park switch 28 at a predetermined location recessed into the side of grip 64 and upshift and downshift switches 66 and 68 thereabove. Neutral latch 30 is shown in essentially the same position as in FIG. 1. Here, it should be noted that the grip configuration shown in FIG. 5 is but one option and that many alternative configurations are contemplated. For example, switch 28 can alternatively be located in the upper region of grip 64 or elsewhere, as desired.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A transmission shift control including a forward position, a neutral position, a reverse position and a shift control lever with a hand grip having a button or switch located thereon comprising:

the switch or button adapted to be manually actuable and operable for actuating a park brake or park lock when the control is in the neutral position.

2. The shift control of claim 1, wherein the control is automatically operable for releasing the park brake or park lock when moved from the neutral position to either the forward or reverse positions.

3. A three position transmission shift control including a forward position, a neutral position and a reverse position, comprising:

a switch or button operable for actuating a park brake or park lock when the control is in the neutral position, wherein the control includes a shift lever shiftable between the forward, neutral and reverse positions, and the switch or button is a momentary switch on the lever or a hand grip of the lever operable for controlling a solenoid that actuates the park brake or perk lock.

4. A three position transmission shift control including a forward position, a neutral position and a reverse position, comprising:

a switch or button operable for actuating a park brake or park lock when the control is in the neutral position, wherein the park brake or lock is actuated by energizing a solenoid.

5. The shift control of claim 4, wherein the park brake or lock is deactuated by de-energizing the solenoid.

6. A three position transmission shift control operable for shifting a transmission between a forward operating mode, a neutral mode, and a reverse mode, comprising a switch or button selectably operable for actuating a park brake when the transmission is in the neutral mode, wherein the control includes a shift lever movable for shifting the transmission between the forward, neutral and reverse modes, and the switch or button is a momentary switch on the lever or a hand grip of the lever operable for controlling a solenoid that actuates the park brake.

7. A transmission shift control operable for shifting a transmission between a forward operating mode, a neutral mode, and a reverse mode, the transmission shift control comprising:

a three-position control shifter movable among a forward position, a neutral position, and a reverse position, the three-position control shifter including a switch or button selectably operable for actuating a park brake when the transmission is in the neutral mode; and a controller including an algorithm, wherein the algorithm commands the automatic release of the park brake when the three-position control shifter is moved from the neutral position to the forward or reverse position.

8. A three position transmission shift control operable for shifting a transmission between a forward operating mode, a neutral mode, and a reverse mode, comprising a switch or button selectably operable for actuating a park brake when the transmission is in the neutral mode, wherein the park brake is actuated by energizing a solenoid.

9. The shift control of claim 8, wherein the park brake is deactuated by de-energizing the solenoid.

10. A three position transmission shift control including a shifter movable between a forward position, a neutral position and a reverse position for placing a transmission in forward, reverse and neutral, respectively, the shift control comprising:

a switch or button on the shifter operable for actuating a park brake or park lock when in the neutral position, wherein the switch or button is a momentary switch operable for controlling a solenoid that actuates the park brake or park lock.

11. A transmission shift control including:

a shifter adapted to be manipulated, the shifter being movable between a forward position, a neutral position and a reverse position for placing a transmission in forward, reverse and neutral, respectively, the shifter including a button operable for actuating a park brake or park lock when in the neutral position, wherein the control is automatically operable for releasing the park brake or lock when the shifter is moved from the neutral position to the forward or reverse position.

12. A three position transmission shift control including a shifter movable between a forward position, a neutral position and a reverse position for placing a transmission in forward, reverse and neutral, respectively, the shift control comprising:

a switch or button on the shifter operable for actuating a park brake or park lock when in the neutral position, wherein the park brake or lock is actuated by energizing a solenoid.

13. The shift control of claim 12, wherein the park brake or lock is deactuated by de-energizing the solenoid.

* * * * *